(12) United States Patent
Leonik

(10) Patent No.: US 7,392,293 B2
(45) Date of Patent: Jun. 24, 2008

(54) METHOD AND APPARATUS FOR DYNAMICALLY DISPLAYING REAL WORLD DATA IN A BROWSER SETTING

(76) Inventor: Thomas E. Leonik, 405 E. Third Ave., Mayville, NJ (US) 08210

( * ) Notice: Subject to any disclaimer, the term of this patent is extended or adjusted under 35 U.S.C. 154(b) by 831 days.

(21) Appl. No.: 10/391,351

(22) Filed: Mar. 18, 2003

(65) Prior Publication Data

US 2004/0205185 A1    Oct. 14, 2004

(51) Int. Cl.
- G06F 15/16    (2006.01)
- G06F 17/24    (2006.01)
- G06F 17/00    (2006.01)
- G05B 15/02    (2006.01)

(52) U.S. Cl. .................. 709/217; 709/203; 709/219; 709/202; 700/9; 707/908; 715/513

(58) Field of Classification Search ................. 709/217, 709/219, 202, 203; 700/9; 707/908; 715/513
See application file for complete search history.

(56) References Cited

U.S. PATENT DOCUMENTS

| | | | |
|---|---|---|---|
| 6,108,662 A | | 8/2000 | Hoskins |
| 6,112,246 A | | 8/2000 | Horbal |
| 6,157,864 A | | 12/2000 | Schwenke |
| 6,185,573 B1 | * | 2/2001 | Angelucci et al. ........ 707/104.1 |
| 6,201,996 B1 | * | 3/2001 | Crater et al. .................... 700/9 |
| 6,331,776 B1 | | 12/2001 | Debbins |
| 6,505,245 B1 | | 1/2003 | North |
| 6,934,734 B2 | * | 8/2005 | Lakhdhir .................... 709/202 |
| 7,000,008 B2 | * | 2/2006 | Bautista-Lloyd et al. .... 709/219 |
| 7,058,671 B2 | * | 6/2006 | Calvo et al. ................. 715/513 |
| 2002/0047863 A1 | * | 4/2002 | Hyman ........................ 345/744 |
| 2003/0004272 A1 | * | 1/2003 | Power ........................ 525/192 |
| 2003/0177175 A1 | * | 9/2003 | Worley et al. ............... 709/203 |
| 2004/0181578 A1 | * | 9/2004 | Elms .......................... 709/205 |
| 2004/0205556 A1 | * | 10/2004 | Abramovitch .............. 715/513 |

* cited by examiner

Primary Examiner—Kenny S Lin
Assistant Examiner—Philip C Lee
(74) Attorney, Agent, or Firm—Brian L. Belles; Buchanan Ingersoll & Rooney PC

(57) ABSTRACT

An apparatus and method for dynamically displaying data in a browser of a client computer. In one aspect, the invention is a method comprising: displaying a web page comprising a primary frame having dynamic fields in said browser, wherein said web page is created by programming language containing specialized tags containing instructional elements adapted to facilitate rendering of visual data in said dynamic fields; searching said programming language of said web page for said specialized tags and creating a companion file, said companion file comprising scripting information based upon said instructional elements and updated real world data stored in a memory source; downloading said companion file; and executing said scripting information contained within said companion file causing said rendering of visual data in said dynamic fields to correspond to said updated real world data.

21 Claims, 9 Drawing Sheets

METHOD AND APPARATUS FOR DYNAMICALLY DISPLAYING REAL WORLD DATA IN A BROWSER SETTING

COPYRIGHT NOTIFICATION

Portions of this patent document contain material that is subject to copyright protection. The copyright owner has no objection to the xerographic or facsimile reproduction of the patent document, or the patent disclosure, as it appears in the United States Patent and Trademark Office, but otherwise reserves all copyright rights whatsoever.

TECHNICAL FIELD OF THE INVENTION

This invention relates generally to the field of human-machine-interfaces and specifically to improved methods and apparatus for dynamically displaying real world data in a setting that utilizes internet capabilities and standard web authoring software.

BACKGROUND ART

Human-machine-interfaces ("HMI"), also known as operator interfaces, are used to present data that is collected by machines to a user via a computer screen or other display module. HMI packages also allow a user to control certain functions of machines from a remote location by entering data into the HMI. HMI packages are commonly used in industrial settings where certain real world conditions must be constantly monitored, maintained, and/or changed with industrial equipment and devices. HMI packages allow users to not only monitor a real world condition with the equipment from a remote location, but also allows the user to control the equipment from the remote location.

Conventional HMI packages consist of an acquisition component to acquire the data from a machine or machines and a visual component that is proprietary in nature for rendering the data into a fixed computer window for the user at the remote location. A programmable logic controller ("PLC") is a computer that is dedicated to performing control functions and is used extensively in industrial applications. In a typical HMI package, a PLC is electrically connected to external devices, such as switches, sensors, relay contacts, gauges, valves, or other types of industrial equipment. The external devices are designed to convert a real world condition into representative electrical data signals. The data signals represent real world condition, such as temperature or the status of a switch being off or on. The PLC is programmed to periodically retrieve this real world data from the external device and transmit it via a serial link to a computer located at a remote site. This real world data is then displayed on a computer screen in an HMI in a tangible form.

HMI packages can also be designed and programmed so that a user can control certain external devices from the remote computer by entering user commands into field of an HMI. In HMI packages with such control capabilities, the PLC or other similar type of computer is further programmed to receive the user inputted data from the remote computer and send control signals to the external device causing the external device to respond according to the user input command.

Despite the sophistication of HMI packages, HMI's contain many undesirable limitations. For example, in displaying the representative real world data in the user's computer screen, HMI packages display a single page that is fixed in size. This is a problem because only one window can be opened at time and in sophisticated industries, a single page is not sufficient to relay all the necessary real world condition. Several pages may be required to display all the relevant data. The user can not easily view all of the necessary real world conditions in a convenient manner. Another drawback is that HMI packages require a proprietary means for creating graphics on a page, for positioning objects on each page, and for rendering data on each page. The ability to share the HMI among multiple computers requires either an installation of the same proprietary software on each machine or some additional software that permits remote computing. Thus, there is a need for an HMI that is inherently web browser based and as such would provide the universal accessibility and the power of the modern day web browser to an HMI.

While browser based HMI's have been developed, existing browser based HMI's operate in an inefficient manner in dynamically rendering the real world data. In order to display the real world data dynamically (i.e., continuously update and change the data displayed in the computer screen to correspond to the real world condition in real time), existing browser based HMI's utilize a browser-based refresh function. Using this refresh function is undesirable because the entire visible screen must be downloaded and reproduced, even if only a small area of the visible page is actually changing. This unnecessary download and reproduction of the entire page is slow and causes the entire screen to flash. This is inefficient from both the client computer and server standpoint.

Thus, a need exists for improved methods and apparatus for dynamically displaying real world data in real time in a browser based HMI.

DISCLOSURE OF THE INVENTION

It is an object of the present invention is to provide a method and apparatus for dynamically displaying data in a browser that does not require the entire visible frame to be refreshed.

Another object of the present invention is to provide a method and apparatus for dynamically displaying data in a browser in a more efficient manner.

A further object of the present invention is to provide a method and apparatus for dynamically displaying data in a browser that requires less time.

A still further object of the present invention is to provide a method and apparatus for dynamically displaying data in a browser that can be accessed via the internet or intranet.

It is also an object of the present invention is to provide a method and apparatus for dynamically displaying data in a browser that does not require proprietary software and/or hardware.

Yet another object of the present invention is to provide a method and apparatus for dynamically displaying data in a browser that can be accomplished using standard web authoring software.

These objects and others are met by the present invention which in one aspect is a method of dynamically displaying data in a browser of a client computer comprising the steps of: displaying a web page comprising a primary frame having dynamic fields in said browser, wherein said web page is created by programming language containing specialized tags containing instructional elements adapted to facilitate rendering of visual data in said dynamic fields; searching said programming language of said web page for said specialized tags and creating a companion file, said companion file comprising scripting information based upon said instructional elements and updated real world data stored in a memory source; downloading said companion file; and executing said scripting information contained within said companion file causing said rendering of visual data in said dynamic fields to correspond to said updated real world data. It is preferable that the downloading step be performed without browser-based refreshing of said primary frame.

In another aspect, the invention is a method of dynamically displaying data in a browser of a client computer comprising the steps of: periodically collecting data representing real world conditions via data collection means; storing said real world data in a memory source, wherein said stored real world data is periodically updated to represent current real world conditions; creating a web page file with programming language containing specialized tags containing instructional elements adapted to facilitate rendering of visual data in dynamic fields; storing said web page file on a host computer; transmitting said web page file to said client computer, wherein a copy of said web page file is stored in a client-side memory; displaying said copy of said web page file in the form of a visual web page in said browser, said visual web page comprising a primary frame comprising said dynamic fields; searching said programming language of said web page file on said host computer for said specialized tags and creating a companion file, said companion file comprising scripting information based upon said instructional elements and said updated real world data stored in said memory source; downloading said companion file to said client computer; and executing said scripting information contained within said companion file causing said rendering of visual data in said dynamic fields to correspond to said updated real world data.

In one embodiment of the method, the visual web page will have a secondary frame that is substantially hidden. In this embodiment, the periodic downloading of the companion file is accomplished by refreshing the secondary frame. Refreshing of the secondary frame is preferably accomplished by incorporating refresh scripting information into the primary frame, wherein the refresh scripting information is adapted to periodically refresh the secondary frame at predetermined intervals of time. Moreover, the secondary frame can further incorporate directional scripting information that directs the scripting information of the downloaded companion file to the specialized tags within the primary frame.

In another embodiment, the periodic downloading of the companion file is accomplished by delineating the companion file as an object and instructing the browser to down-loaded the object at set intervals of time. Downloading of the companion file in this embodiment is accomplished by using a download object such as Microsoft's Internet Explorer's "DownLoad" or an object created for this task and the primary web page uses this object to download the companion file at set intervals of time.

It is preferable that the searching and creating step be continuously repeated, one being performed upon the completion of the other. It is also preferable that all scripting be performed on a client side and the companion page be stored on the host computer after creation.

The web page file can be created using web authoring software that supports standard programming language such as HTML code or XML code. The specialized tags can be added to the programming language by standard web authoring software that supports modifying the HTML or XML code. It is preferable that the specialized tag be added to said programming language by software that provides access to said programming code. However the specialized tags may placed by loading the web file into any text editor software that permits files to be stored as pure text and contains no formatting instructions and adding the specialized tags then saving the file. Alternatively, the specialized tags can be added to said web page file that was originally created by a first web authoring software that does not support access to said programming language but where said web page file is loaded into a second web authoring software that does support adding said specialized tags. The host computer is preferably a server and the client-side memory is preferably a browser memory.

It is preferred that upon the scripting information within the downloaded companion file being executed that the copy of the web page stored in the client-side memory be updated to correspond to the updated real world data. When used to control external machinery to perform real world function, the method will further comprise the steps of: receiving user control data inputted by a user at said client computer; transmitting said user control data to a logic controller adapted to convert user control data into control signals; and sending said control signals to a real world device, wherein upon receipt of said control signals, said real world device is manipulated in accordance with said control signals.

In yet another aspect, the invention is an apparatus for dynamically displaying data comprising: a graphical interface for displaying a web page comprising a primary frame having dynamic fields, wherein said web page is created by programming language containing specialized tags containing instructional elements adapted to facilitate rendering of visual data in said dynamic fields; means for searching said programming language of said web page for said specialized tags; means for creating a companion file comprising scripting information based upon said instructional elements and updated real world data stored in a memory source; means for downloading said companion file; means for executing said scripting information contained within said companion file; and means for changing said rendering of visual data in said dynamic fields to correspond to said updated real world data.

The web browser is a very powerful software component that circumvents all the previous boundaries in computers such as operating systems, central processing units and so on. It is the universality and power of the web browser that makes the internet such an incredible and successful tool today. The present invention utilizes the power of the web browser, the vast collection of web authoring software, and the vast collection of add-in web components to realize an HMI approach that is superior to the conventional approach. From a business perspective, businesses are already integrating knowledge bases and such with a browser approach so the staff already has web development knowledge. Most office components like word processors and spreadsheets provide an option to save the work as a web page. Most technically employed employees are already using web authoring software to some extent so there would not be a need to learn proprietary software to create an HMI. If one did not have any prior knowledge of web authoring software it would be more beneficial to learn the methods of the web page generation where the subject matter learned would also be applicable to other areas outside of an HMI. The present invention successfully and uniquely merges the techniques of web page creation with the creation of a HMI. This task is accomplished utilizing standard HTML components as defined by the World Wide Web Consortium, standard commercially available web authoring software, and the methods described in the present invention.

MODES FOR CARRYING OUT THE INVENTION

Figure 1:
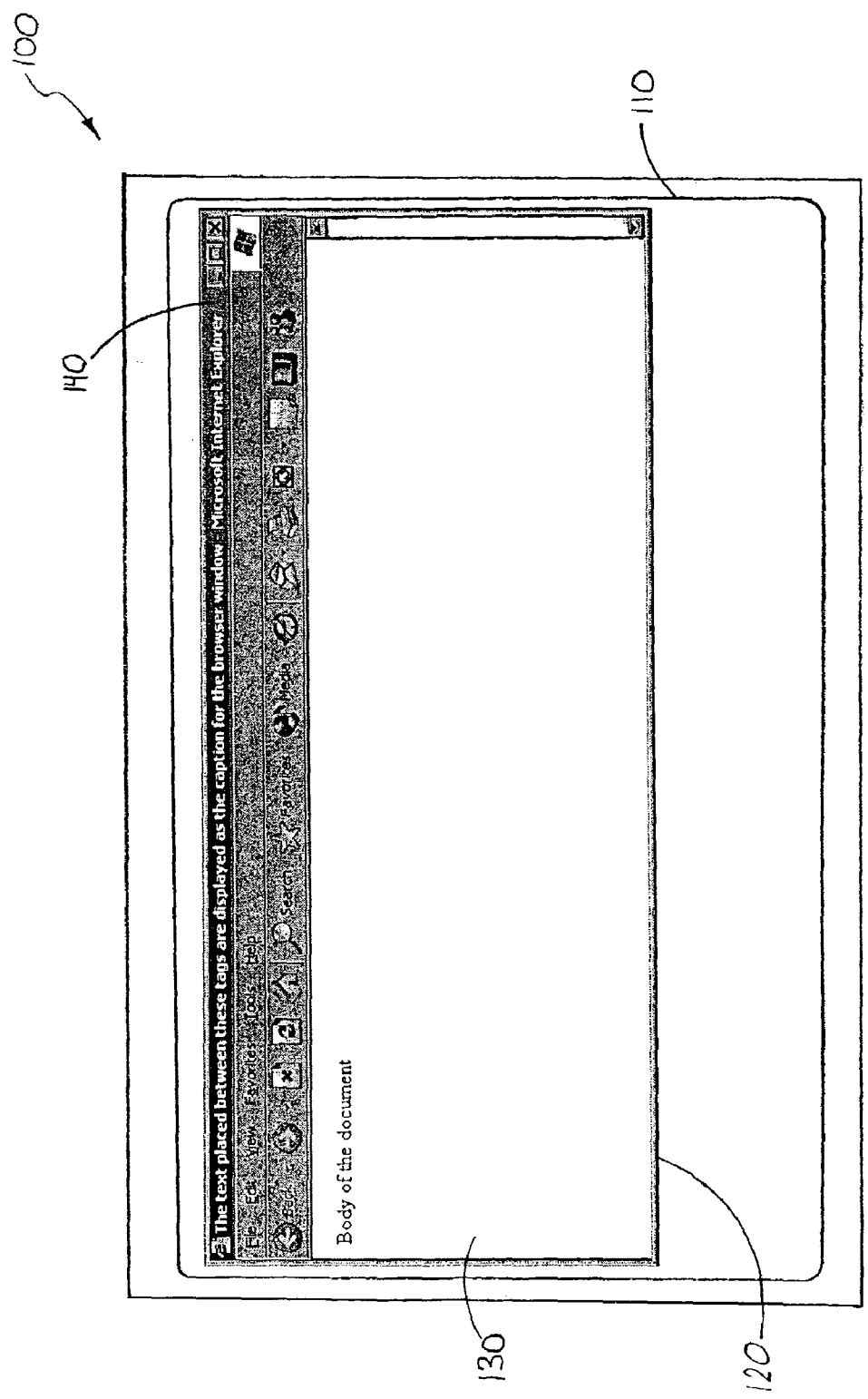
FIG. 1 is a schematic of a computer monitor displaying a simple web page in Microsoft's Internet Explorer browser.

The present invention provides an apparatus, method, and computer program products that facilitate the use of modern web authoring software to create a Human Machine Interface ("HMI") that is inherently web browser based that produces dynamic web pages that render real world data in real time. The invention is a design for the automatic rendering of real time data acquired by external devices including the internet into an appropriate form for human visualization by utilizing a web browser. Construction of the web pages can be performed with many popular web authoring software packages. Data is rendered dynamically and in the background on the web page without performing a browser based refresh and with a minimal amount of scripting on the actual web page.

The preferred embodiments of the invention will be illustrated with reference to the drawings. Various other embodiments should become readily apparent from this description to those skilled in this art. It should also be noted that all embodiments with respect to software scripting will be provided in Visual Basic script only because the Visual Basic script is more readable then Java script. All software scripting for the present invention can also be accomplished using Java script or any other scripting language that a web browser supports by simply modifying the code output.

In order to fully understand the present invention, it will be helpful to provide a basic background relating to browser and world wide web technology. The World Wide Web Consortium ("WWWC") is an organization that controls the specifications of the internet. Due to the rapid expanse of the internet and the rapid development of computer related technology, the WWWC is always in a state of evolution. A web browser is any software module that adheres to specification of the WWWC. Web browsers permit a standardization of information rendering across many different computer platforms, such as Microsoft Windows, Apple Computer, UNIX, and Linux. A web browser allows the same data to be viewed by a user on any client-side computer platform capable of running a browser application. The data to be viewed is stored in the form of a web page file on a host computer, such as a server, and viewed in a web browser on the display module of client computer in the form of a visible web page.

Web page files typically consist of Hyper Text Markup Language ("HTML") or Extensible Markup Language ("XML"), which are two specifications launched by the WWWC. HTML and XML consist of many different tags that control the format attributes as well as identify different portions of a web page file that is to be displayed in a browser as a visible web page. In the very beginning of the world wide web and networking capabilities, HTML had a very minimal set of tags that were inherently static. Server side developments soon evolved that allow the creation of web page files that provided content that was no longer fixed.

The WWWC enhanced the ability of the HTML tags so that they may be altered on the client side by programming that is commonly called scripting. This scripting can be accomplished typically by either Java script which is scripting that adheres to the methods of the Java programming language or by Visual Basic script which is scripting that adheres to the methods of the Visual Basic programming language. The scripting methodology is one technique that brings otherwise static web pages to life. Client-side scripting provides dynamic content to a visible web page without the need for server participation. This is beneficial because server participation causes data to be rendered very slow at times, especially during times of heavy server traffic or with a slow connection speed. With client-side scripting, code could be written to periodically move an image file around a visible web page or to periodically change the colors of fonts. In essence client-side scripting makes the web page look more interesting and appealing without the need of server participation.

Construction of web page files can be performed with many popular web authoring software packages, such as Microsoft's FrontPage. By utilizing web authoring software for web page creation for the browser based HMI, all of the capabilities of the web authoring software, present and future, are inherited. For example, Web cameras can be seamlessly integrated into the HMI to acquire visual information of certain processes or locations, databases can be queried for information or updated with new information, and alarm conditions can be broadcast with email. Moreover, Pertinent documents such as standard operating procedures ("SOP's"), operational manuals, problem history, and quotations can be easily converted to HTML and linked to the HMI. Finally, web links to vendor web sites for additional information can be provided if the internet is available.

Web authoring software can also be used to add or alter scripting tags to web page files that already exist on a server. Although many HTML tags can be altered via scripting, only several HTML tag elements will be examined in this disclosure for exemplary purposes.

Referring to FIG. 1, computer monitor 100 having display area 110 is illustrated. Browser 120 is displayed within display area 110. While browser 120 is Microsoft's Internet Explorer, the present invention is nor limited to any particular browser embodiment and browser application can be used, e.g., Netscape Navigator. Browser 120 is used to display/render a web page file in the form a visible web page 130. Visible web page 130 is created by Microsoft's Front Page but can be created by any web authoring software package or with HTML code and a text editor. The web page file comprises HTML tags that control the visible content rendering that of visible web page 130 and header 140 within browser 130.

HTML tags perform certain formatting tasks in a web page file. A tag is contained within a "<" symbol and a ">". Most tags are required to have a start tag "<TAG>" and an end tag "</TAG>". The start tag specifies the element type and associated attributes if desired. The area between the start tag and end tag is called the content. The structure of the tags that would render visible web page 130 and header 140, if the text as shown was placed into a text document and saved with a ".HTML" or "HTM" extension, are as follows:

```
<HTML>
<HEAD>
<TITLE>The text placed between these tags are displayed as
the caption for the browser window</ TITLE >
</HEAD>
<BODY>
Body of the document
</BODY>
<SCRIPT LANGUAGE="VBScript">
'Client side scripting is placed in this area.
'Anything place in this area is considered executable program
'code of the language specified in the script tag and will not
'be rendered by the web browser.
</SCRIPT>
</HTML>
```

Figure 2:
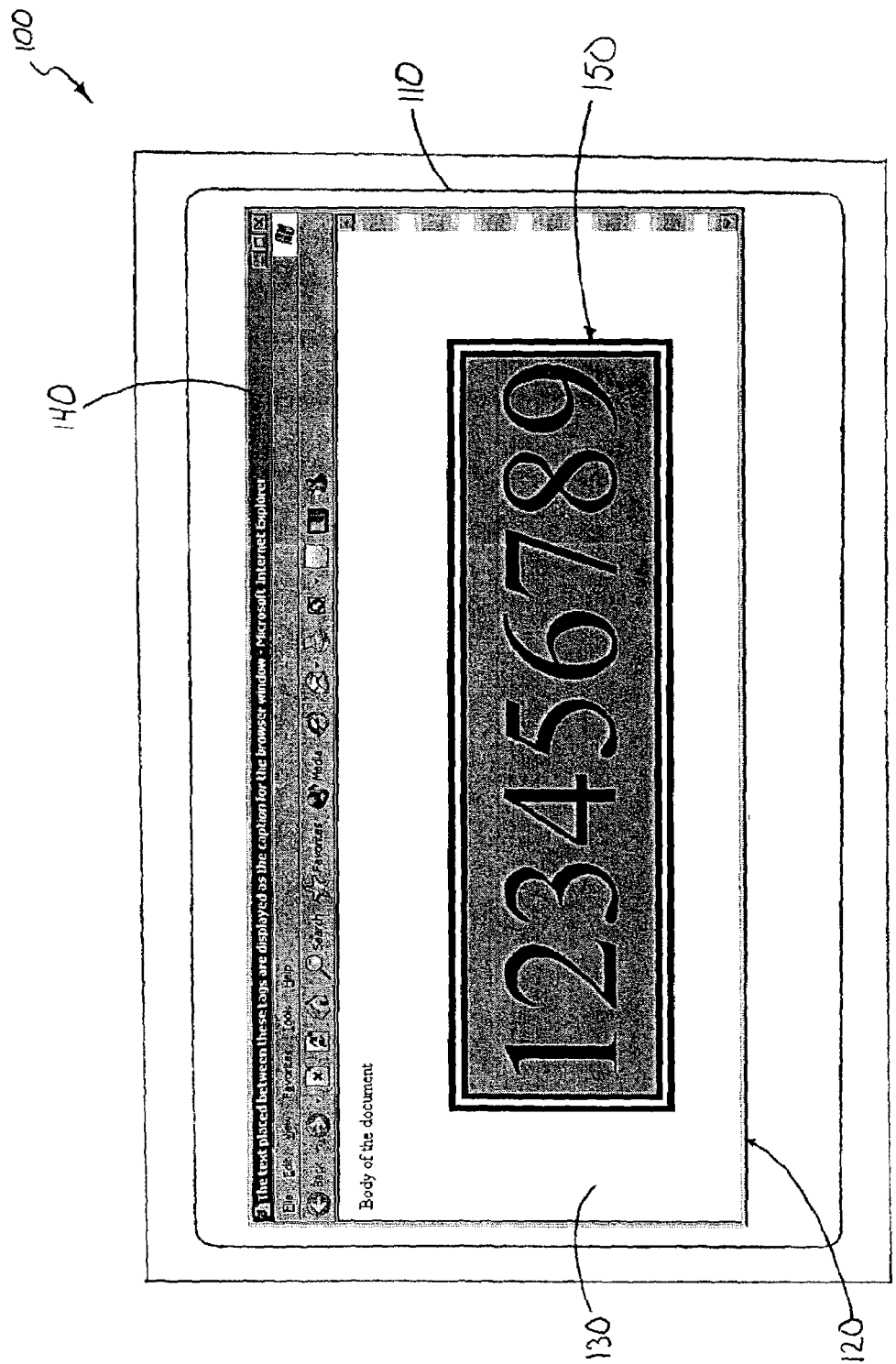
FIG. 2 is a schematic of the computer monitor of FIG. 1 displaying a simple web page in Microsoft's Internet Explorer browser with a DIV graphic.

FIG. 2 is a schematic of computer monitor 100 displaying visible web page 130 in browser 120 wherein visible web page 130 comprises DIV graphic 150. DIV graphic 150 is created by including a DIV tag in the HTML code that renders visible web page 130. The DIV tag serves as a container and adds an extra structure to visible web page 130 in the form of DIV graphic 150. The DIV tag that is added to the HTML code to create DIV graphic 150 reads as follows:

```
<div Id = "tag1" style="border:17px double #000000; position: absolute;
top: 100; left: 100; width: 72; height: 19; text-align:center;
background-color:#00FFFF; font-family:Times New
Roman; font-size:150">
123456789 </div>
```

Elements are provided within a DIV tag for specifying attributes of the resulting DIV graphic. For example, the above DIV tag comprises elements that specify an identity equal to "tag1," a double border of black, absolute positioning, font type, font size, text alignment, background color, and content. The content of the example DIV tag that will be displayed in DIV graphic 150 in visible web page 130 is "123456789." Positioning in an HTML document is based on pixels and the origin is the upper left-hand corner of the document corresponding to top=0 and left=0. A position of top=100 is 100 pixels down from the origin.

Figure 3:
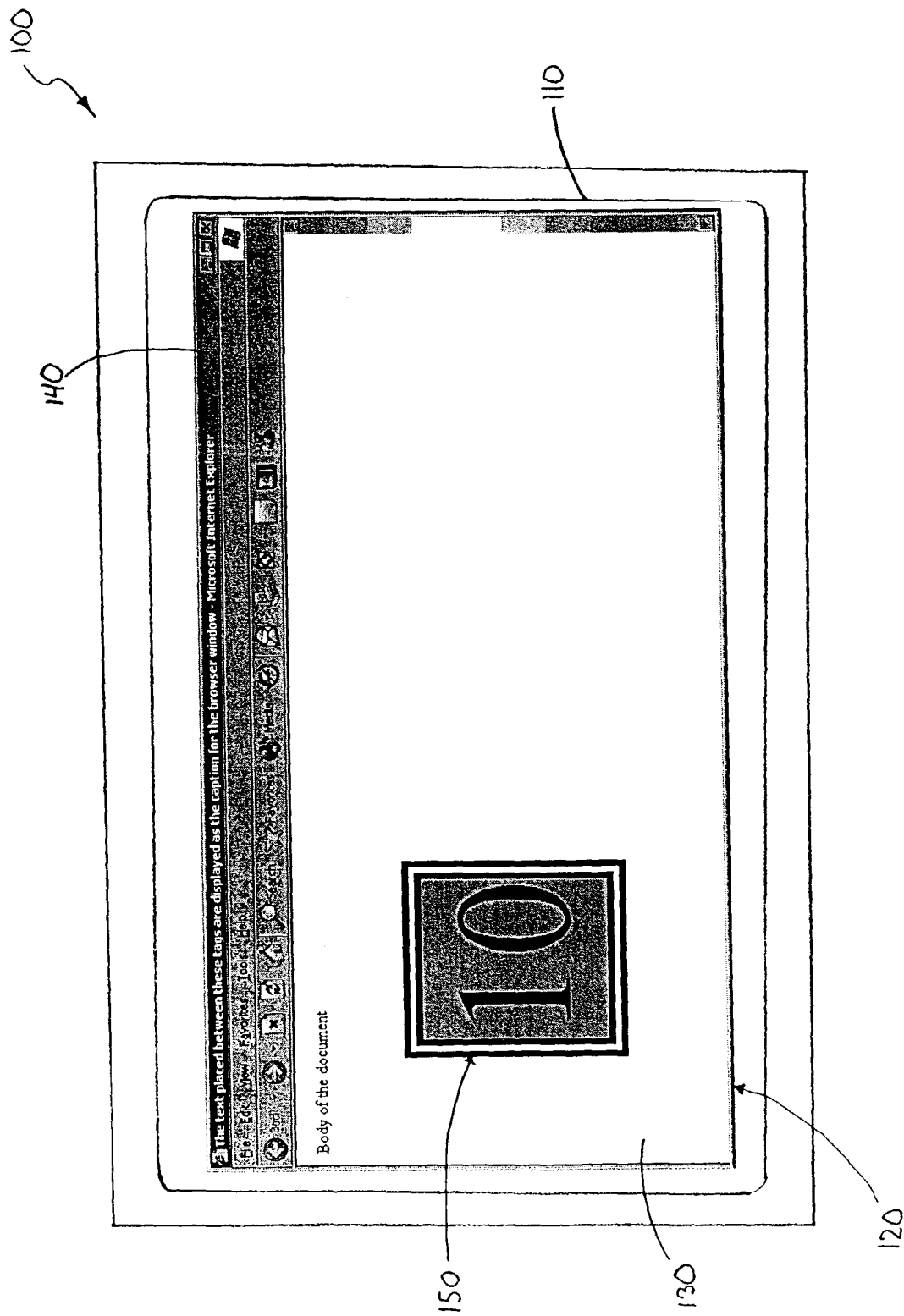
FIG. 3 is a schematic of the computer monitor of FIG. 1 displaying a simple web page in Microsoft's Internet Explorer browser with the DIV graphic and scripting, wherein the DIV graphic is illustrated ten seconds after it is loaded into the browser.

Referring now to FIG. 3, a schematic of computer monitor 100 displaying visible web page 130 with DIV graphic 150 controlled by scripting is illustrated ten seconds after it is loaded into the browser. DIV tags, such as the one above, can be controlled by scripting to dynamically display information. In controlling DIV graphic 150 by scripting, a variable x is first initialized to a value of 1 for display in DIV graphic 150. A software timer is then created with a "window.setinterval" instruction to a value of 1000 milliseconds. This timer will activate every 1 second interval and execute the subroutine called "SecondTick". The subroutine increments the value of x by 1 and then changes the content value of the DIV tag identified with the name "Tag1" to the value of x. A corresponding change is made within DIV graphic 150 within visible web page 130. After approximately 10 seconds after loading the visible web page 130 into browser 120, browser 120 renders DIV graphic 150 as illustrated in FIG. 3. The "tag1.innertext=x" instruction performs this task. The initial content of the DIV identified as Tag1 which was originally the value "123456789," starts at "1" and is changed every second to the value of x. The scripting language used to generate the web page of FIG. 3 reads as follows:

```
<HTML>
<HEAD>
<TITLE>The text placed between these tags are displayed as
the caption for the browser window</TITLE>
</HEAD>
<BODY>
Body of the document
<div Id = "tag1" style="border:17px double #000000; position:
absolute; top: 100; left: 100; width: 72; height: 19; text-align:center;
background-color:#00FFFF; font-family:Times New Roman; font-size:
150">
123456789 </div>
</BODY>
<SCRIPT LANGUAGE="VBScript">
x=1
window.setinterval "secondtick", 1000, "VBscript"
Sub secondtick( )
x=x+1
tag1.innertext=x
end sub
</SCRIPT>
</HTML>
```

The above HTML examples provides one of many methods possible using HTML tags and scripting to render dynamic information on a visible web page. This is one of several techniques that can be used in carrying out the present invention to animate a visible web page with respect to real world data in real time.

Figure 4:
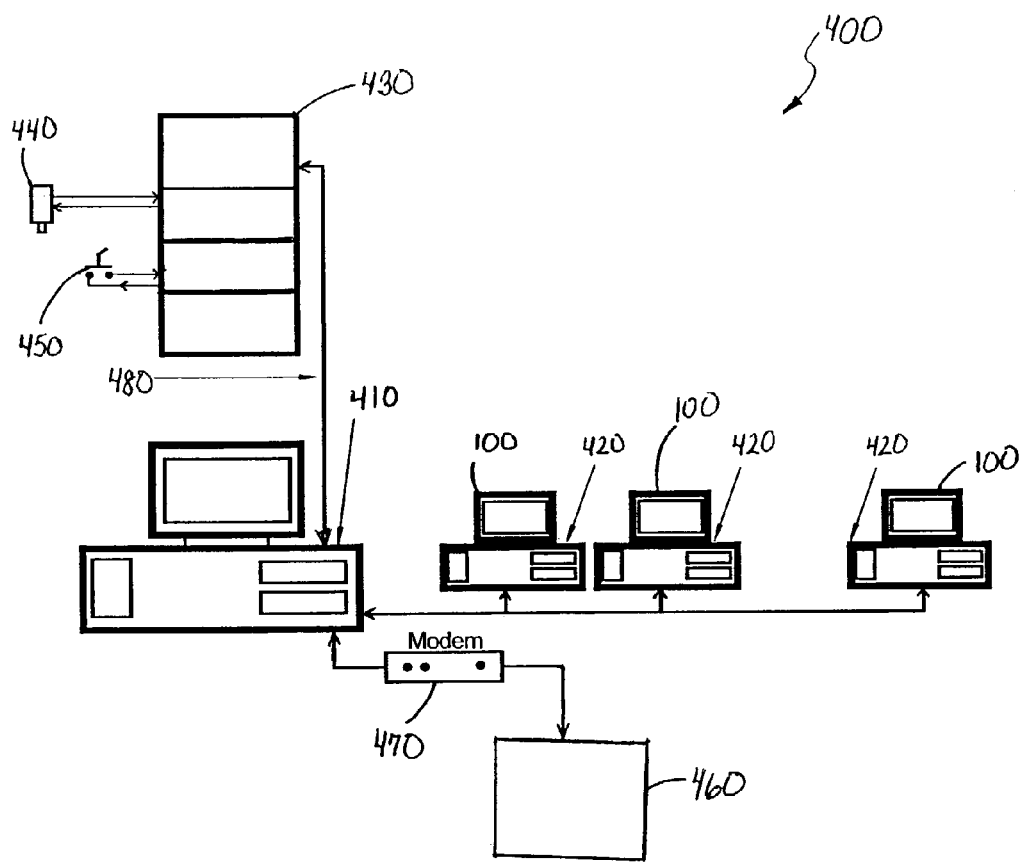
FIG. 4 is a schematic of an HMI system for dynamically displaying real world data in a browser of a client computer.

FIG. 4 is a HMI system 400 configured to collect real world data and dynamically display the real world data in the browser of a remotely located client computer according to the present invention. HMI system 400 comprises host computer 410, client computers 420, programmable logic controller 430, pressure transducer 440, and switch 450. Host computer 410 can also be connected to wide area network 460, such as the internet, through the use of modem 470. Host computer 410 has server capabilities and is adapted to host web pages. Client computers 420 are directly linked to host computer 410 to form a local area network. Each client computers 420 comprises computer monitor 100 (FIGS. 1-3) that is capable of downloading and displaying the web pages hosted on host computer 410. All computers in FIG. 4 comprise properly programmed processors, ports, connections, memory sources, and other hardware necessary to carry out their necessary function as will be explained in detail below.

Host computer 410 is linked to programmable logic controller ("PLC") 430 via serial link 480 for communication. As used herein, the term communication encompasses both the receipt and transmission of data between computers. Communication between host computer 410 and PLC 430 is accomplished serially and with the required protocol. PLC 430 is connected to pressure transducer 440 and switch 450 so as to communicate therewith. PLC 430 is a computer that is dedicated to performing control functions and is used extensively in industrial applications. PLC 430 can output data signals that can be used to control machinery based on the input of external devices like switches, sensors, relay contacts and so on. Data received from host computer 410 can also be written to PLC 430. A single PLC is illustrated in FIG. 4 but HMI system 400 can be adapted to communicate over many serial links and with many different types of computers.

Figure 5:
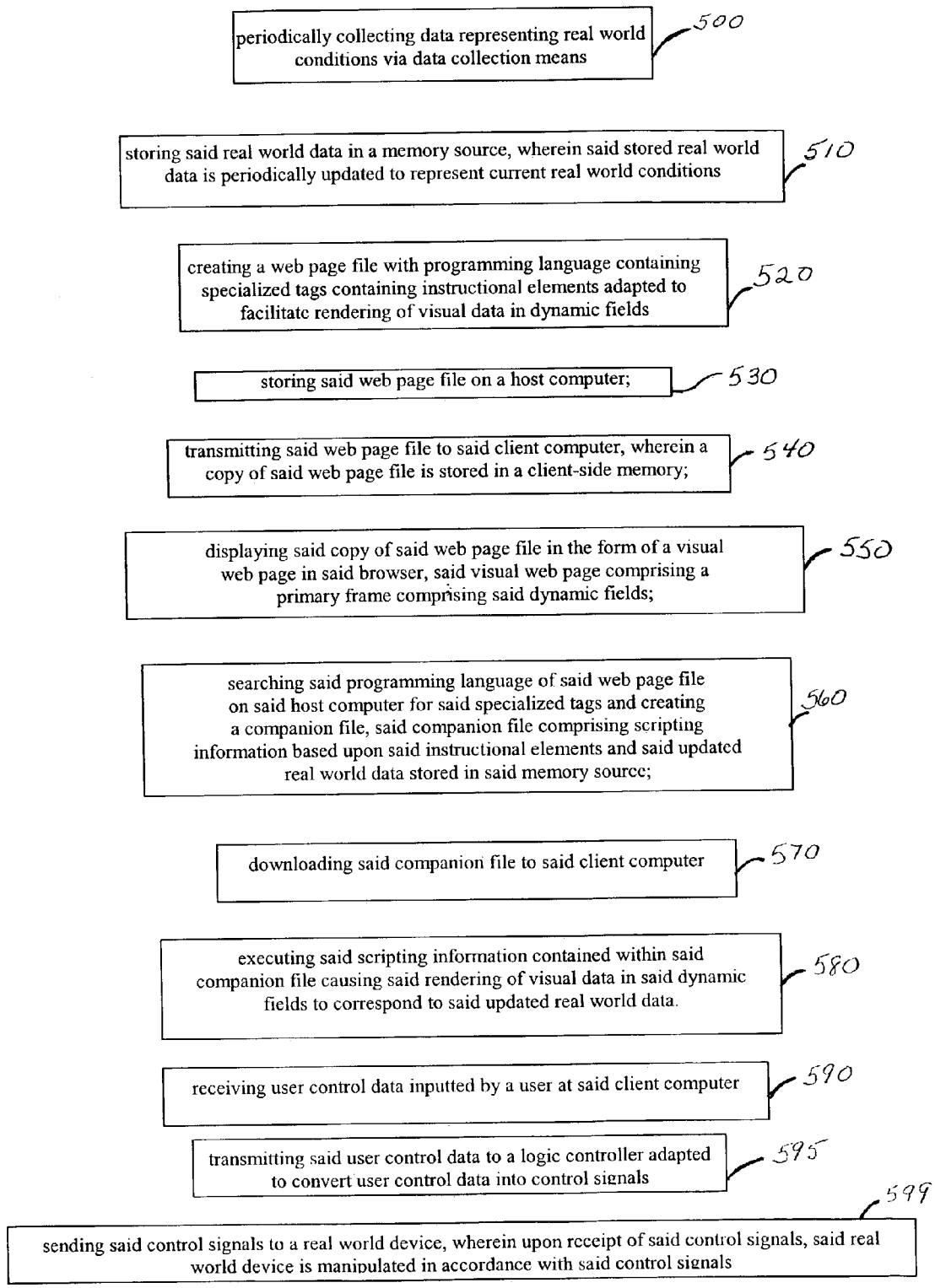
FIG. 5 is a flowchart of an embodiment of a method for dynamically displaying real world data in a browser of a client computer using the HMI system of FIG. 4.

FIG. 5 is a flowchart of a method for dynamically displaying real world data in a browser of a client computer according to the present invention. FIG. 5 will be discussed in relation to the system of FIG. 4. The appropriate functions of host computer 410, client computers 420, and PLC 430 are accomplished by properly programmed processors working in conjunction with software. It should be noted that the various functions can be accomplished by a variety of external software component(s) adapted to relay the necessary information to the proper computer by methods available through that of common operating systems.

Pressure transducer 440 is adapted to measure the pressure of a real world condition. For example, the pressure within a closed volume can be measured or the pressure applied to/by a device can be measured. These real world pressure measurements are then converted into a corresponding data signal and communicated to PLC 430. Switch 450 has an "on" and an "off" position. The input status of Switch 450 can be used to control almost any real world piece of industrial machinery with the use of control logic and an output device such as relay. For example, switch 450 may activate or deactivate a pump, a conveyor belt, or a heater. PLC 430 communicates with switch 450 via data signals and can determine the real world status of switch 450 as "on" or "off." While a pressure transducer and switch are illustrated, this is for exemplary purposes only. The present invention can be used in conjunction with any kind of external data source.

PLC 430 is programmed to periodically retrieve data from pressure transducer 440 and switch 450 at set intervals of time. Alternatively, PLC 430 can be programmed to continuously retrieve the data. After being retrieved, this real world data is stored in separate registers of a non-volatile memory of PLC 430. As PLC 430 periodically retrieves updated real world data from pressure transducer 440 and switch 450, the real world data previously stored in the memory of PLC 430 is updated to correspond to the current real world conditions being driven by switch 450 and pressure transducer 440. As such, real time data is stored in the memory of PLC 430 and steps 500 and 510 of FIG. 5 are completed.

Figure 6:
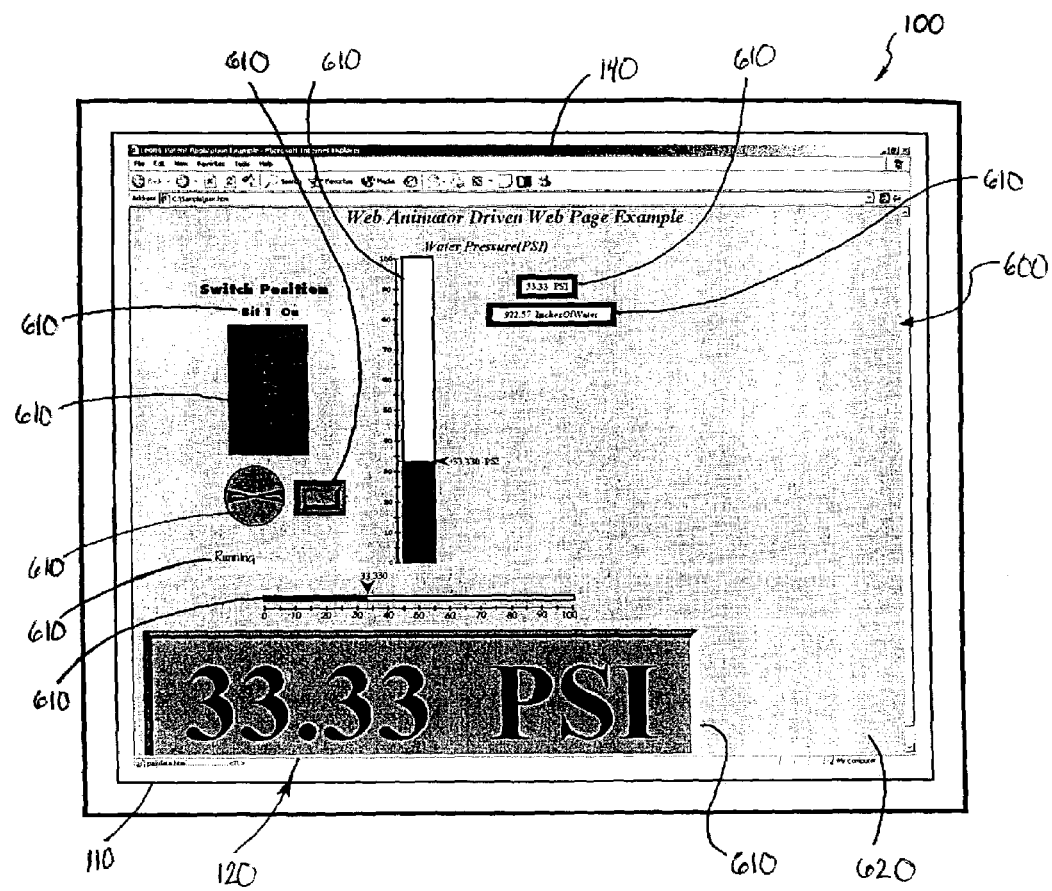
FIG. 6 is a schematic of a computer monitor displaying a dynamic HMI produced according to the method of FIG. 5 at a first time.

A user creates a web page file using web authoring software such as Microsoft's FrontPage and stores the web page file in a non-volatile memory of host computer 410. This web page file is preferably created using HTML code. However, XML or any other programming code can also be used. The HTML code is written so that HMI 600 in FIG. 6 is displayed in browser 120 when the web page file is displayed in compute monitor 100 of client computer 420. This process will be explained below in more detail.

Referring to FIG. 6, HMI 600 is illustrated. HMI 600 is the visual rendering of the web page file created by the user and stored on host computer 410 with the dynamic rendering of the real world data according to the present invention. HMI 600 comprises both static portions and dynamic fields 610. Dynamic fields 610 are designed to dynamically render visual data corresponding to the real world data stored in PLC 430 as discussed above. A dynamic web page is considered to be a web page that requires background updating of components.

The first step in creating HMI 600 is the design of the static portions of the web page file. Any web authoring software like Microsoft's FrontPage may be used to create these portions. The layout, photographs, graphics, background colors, descriptive text, links to other documents and so would be placed in the web page file using any preferred web authoring software. These static portions are created by either writing text or loading image files then highlighting the element and instructing it to be positioned "absolutely" on the page. The absolute position wraps the element in either a DIV or SPAN HTML tag. The DIV and SPAN are container tags that can be manipulated with script. Once a static element is contained in a DIV or SPAN tag it can be positioned any where on the web page by dragging it with the mouse. Additionally formatting attributes such a font type, font size, font color, background color, width, height, visibility, left position, top position, border type, border color and so on may be adjusted accordingly by the web authoring software and by script.

Figure 8:
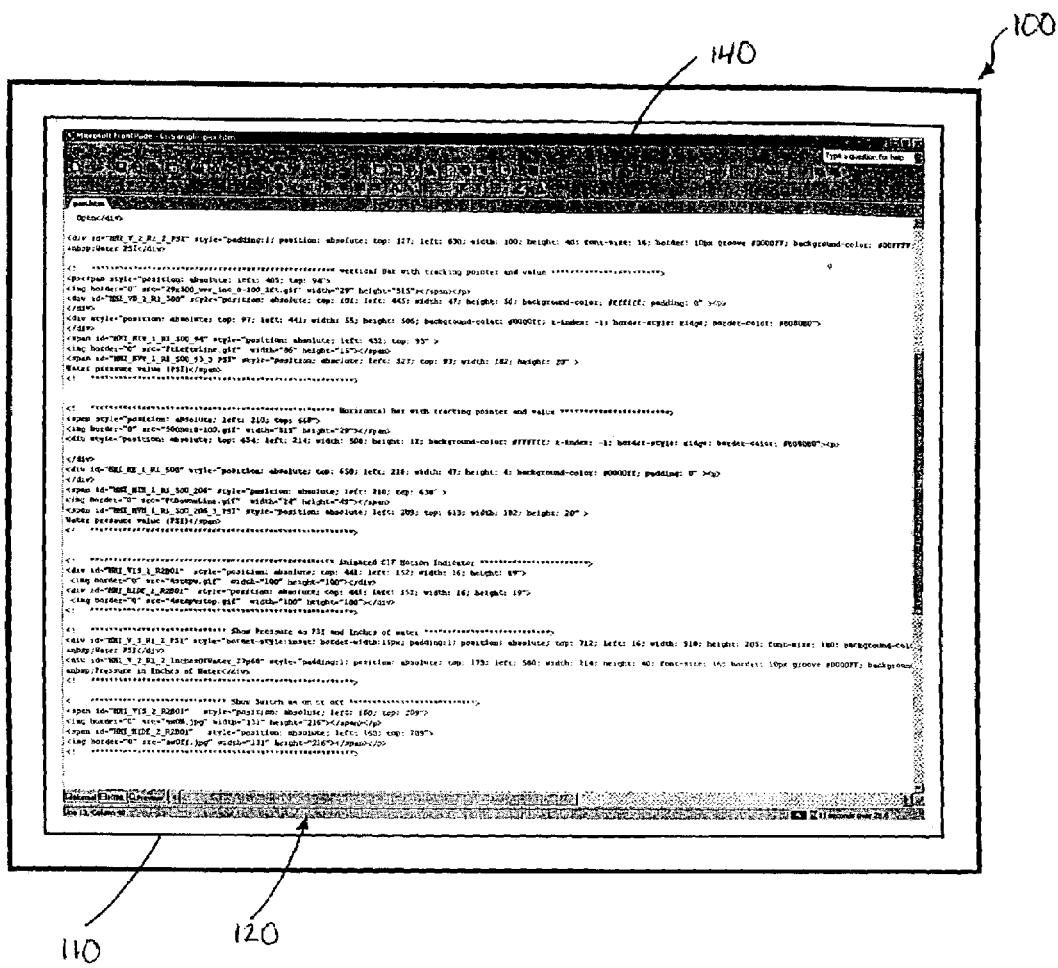
FIG. 8 is a schematic of a computer monitor displaying the HMI of FIG. 6 in HTML mode.

Once the static layout of the web page file is complete, specialized tags are added to the web page file to control the rendering of visual dynamic data in dynamic field 610. Adding specialized tags is accomplished by viewing the web page file in HTML mode of Microsoft FrontPage and cursoring over to the desired tag and specifying the required Tag ID Type. The HTML view mode of FIG. 6 is shown if FIG. 8. Specialized tags are created by delineating those tags with specialized ID prefixes. Tag structure requires some unique identifying prefix to distinguish between tags that need to be parsed and processed by host computer 420 for dynamic rendering of real world data in dynamic fields 610 and those that do not. The following example shows a specialized ID prefix of "HMI" for the Human Machine Interface being used. The prefix could just as well be an underscore character by itself or anything else for that matter. A distinguishable specialized ID prefix is required in order to facilitate the tag parsing task performed by host computer 410 (discussed below). In addition to having specialize ID prefixes for parsing and identification, specialized tags also comprise instructional elements that facilitate and control the rendering of the visual data within dynamic field 610. An example of a specialized tag structure is shown below:

---

Specialized Tag Structure:

HMI_(Element1)_( Element2)_(Element3)_(Element4)....._Element N
The instructional elements contained in the above tag are delimited
with an underscore character.
Element 0 must always be "HMI" or the tag will not be processed.
Element 1 is a command.
Element 2 is a unique identifier number. Permits multiple Tags of the
same form on a page.
Element 3 is the data point to monitor.
Element 4 is variable depending upon the command.
Element 5 is variable depending upon the command.
Element N is variable depending upon the command.

---

The instructional elements of the specialized tag can be any commands available. Some of the commands that can be used in conjunction with the present invention along with an explanation of how each command works are provided below. These few commands alone easily rival the capabilities of most conventional HMI packages.

---

VIS - Visibility used to control the visibility of an object: visible or
hidden
Example: HMI_VIS_1_R1000B01

```
Element: 0 1 2 3
Host computer response: (shown in Bold)
Data point R1000B01(Register 1000 bit 1) = 1
HMI_VIS_1_R1000B01.style.visibility = "visible"
Data point R1000B01(Register 1000 bit 1) = 0
HMI_VIS_1_R1000B01.style.visibility = "hidden"
HIDE - Inverse Visibility used to control the visibility of an object: visible or hidden
Example: HMI_HIDE_1_R1000B01
Element: 0 1 2 3
Host computer response: (shown in Bold)
Data point R1000B01(Register 1000 bit 1) = 1
HMI_HIDE_1_R1000B01.style.visibility = " hidden"
Data point R1000B01(Register 1000 bit 1) = 0
HMI_HIDE_1_R1000B01.style.visibility = "visible"
AM - Displays the attached message
Example: HMI_AM_1_R1000B01_Running_Stopped
Element: 0 1 2 3 4 5
Element 4 is the message rendered when the data point is a one.
Element 5 is the message rendered when the data point is a zero.
Host computer response: (shown in Bold)
Data point R1000B01(Register 1000 bit 1) = 1
HMI_AM_1_R1000B01_Running Stopped.innertext = "Running"
Data point R1000B01(Register 1000 bit 1) = 0
HMI_AM_1_R1000B01_Running_Stopped.innertext = "Stopped"
M or MES - Displays the message provided in the Input/Output table
Note: The Input/Output table allows a message to be assigned when the bit is one and a message
to be assigned when the bit is zero.
Example: HMI_M_1_R1000B01_15_11
Element: 0 1 2 3 4 5
Element 4 is optional and specifies the number of characters to display of the pre-assigned message.
Element 5 is optional and specifies start position of pre-assigned messages.
If both element 4 and element 5 are not provided the entire pre-assigned message is rendered.
Host computer response: (shown in Bold)
Data point R1000B01(Register 1000 bit 1) = 1
Input/Output Message for a 1 is "Pump 1 -- Overload Alarm check pump for clogging"
HMI_M_1_R1000B01_15_11.innertext = "Overload Alarm"
Data point R1000B01(Register 1000 bit 1) = 0
Input/Output Message for a 1 is "Pump 1 -- Overload Normal"
HMI_M_1_R1000B01_15_11.innertext = "Overload Normal"
P or C - Paint or Color the object
Example: HMI_P_1_R1000B01_darkorange_deepskyblue
Element: 0 1 2 3 4 5
Note: Color name must be as specified by the World Wide Web Consortium.
Element 4 (optional) is the color to render when the data point is a one.
Element 5 (optional) is the color to render when the data point is a zero.
If element 4 and element 5 are excluded from the command then the default color is rendered. "Lime" for a 1 and
"Black" for a 0.
Host computer response: (shown in Bold)
Data point R1000B01(Register 1000 bit 1) = 1
HMI_P_1_R1000B01_darkorange_deepskyblue.style.background= "darkorange"
Data point R1000B01(Register 1000 bit 1) = 0
HMI_P_1_R1000B01_darkorange_deepskyblue.style.background = "deepskyblue"
V - Render a Value. Used to render a value
Example: HMI_V_1_R200_3_GPM_0p3333
Element: 0 1 2 3 4 5 6
Element 4 (optional) is the number of decimal places. Range is 0 to 4.
Element 5 (optional) is text indicating the units of the value and is appended to the value rendered.
Element 6(optional) is a multiplier value. The letter P must be used in place of a decimal point (0.5 => 0p5)
Host computer response: (shown in Bold)
Data point R200(Register 200) contains the value 50
HMI_V_1_R200_3_GPM_0p3333.innertext="16.665 GPM"
Note: Optional elements can be excluded by leaving the position blank.
If the tag above was HMI_V_1_R200_3_0p3333 then GPM would not be rendered.
MVV - Move Value Vertically. Used to proportionally move a value vertically along a
range of pixels.
Example: HMI_MVV_1_R200_1000_500_2_GPM
Element: 0 1 2 3 4 5 6 7
Element 4 is the range of pixels to move within.
Element 5 is the pixel location of the top starting point of the range.
Element 6 (optional) is the number of decimal places. Range is 0 to 4.
Element 7 (optional) is text indicating the units of the value and is appended to the value rendered.
Element 8(optional) is a multiplier value. The letter P must be used in place of a decimal point (0.5 => 0p5)
Host computer response: (shown in Bold)
Note that this command produces two responses an innertext and an style.posTop.
Data point R200(Register 200) contains the value 5000 which = 25 GPM
If the full range of the data point is 10000 the following responses would be sent.
HMI_MVV_1_R200_1000_500_2_GPM.innertext="25.00 GPM"
HMI_MVV_1_R200_1000_500_2_GPM.style.posTop="1000"
MIV - Move Item Vertically. Used to move a item such as a image file vertically
```

-continued

```
proportionally along a range of pixels.
Example: HMI_MIV_1_R200_1000_500
Element: 0 1 2 3 4 5
Element 4 is the range of pixels to move within.
Element 5 is the pixel location of the top starting point of the range.
Element 6(optional) is a multiplier value. The letter P must be used in place of a decimal point (0.5 => 0p5)
Host computer response: (shown in Bold)
Data point R200(Register 200) contains the value 5000
If the full range of the data point is 10000 the following response would be sent.
HMI_MIV_1_R200_1000_500.style.posTop="1000"
VB - Vertical Bar. Used to create a vertical bar graph along a range of pixels.
Example: HMI_VB_1_R200_1000 Element: 0 1 2 3 4 5
Element 4 is the range of pixels to move within.
Element 5(optional) is a multiplier value. The letter P must be used in place of a decimal point (0.5 => 0p5)
Host computer response: (shown in Bold)
Data point R200(Register 200) contains the value 5000 and the Tag top position =500.
If the full range of the data point is 10000 the following response would be sent.
HMI_VB_1_R200_1000.style.pixelHeight="1000"
MVH - Move Value Horizontally. Used to value horizontally along a range of pixels.
Example: HMI_MVH_1_R200_1000_500_2_GPM
Element: 0 1 2 3 4 5 6 7
Element 4 is the range of pixels to move within.
Element 5 is the pixel location of the left starting point of the range.
Element 6 (optional) is the number of decimal places. Range is 0 to 4.
Element 7 (optional) is text indicating the units of the value and is appended to the value rendered.
Element 8(optional) is a multiplier value. The letter P must be used in place of a decimal point (0.5 => 0p5)
Host computer response: (shown in Bold)
Note that this command produces two responses an innertext and an style.Posleft.
Data point R200(Register 200) contains the value 5000 which = 25 GPM
If the full range of the data point is 10000 the following responses would be sent.
HMI_MVH_1_R200_1000_500_2_GPM.innertext="25.00 GPM"
HMI_MVH_1_R200_1000_500_2_GPM.style.posleft="1000"
MIH - Move Item Horizontally. Used to proportionally move an item, such as an image
file, horizontally along a range of pixels.
Example: HMI_MIH_1_R200_1000_500
Element: 0 1 2 3 4 5
Element 4 is the range of pixels to move within.
Element 5 is the pixel location of the left starting point of the range.
Element 6(optional) is a multiplier value. The letter P must be used in place of a decimal point (0.5 => 0p5)
Host computer response: (shown in Bold)
Data point R200(Register 200) contains the value 5000
If the full range of the data point is 10000 the following response would be sent.
HMI_MIH_1_R200_1000_500.style.posleft ="1000"
HB - Horizontal Bar. Used to create a Horizontal bar graph along a range of pixels.
Example: HMI_HB_1_R200_1000
Element: 0 1 2 3 4 5
Element 4 is the range of pixels to move within.
Element 5(optional) is a multiplier value. The letter P must be used in place of a decimal point (0.5 => 0p5)
Host computer response: (shown in Bold)
Data point R200(Register 200) contains the value 5000 and the left position is 0
If the full range of the data point is 10000 the following response would be sent.
HMI_VB_1_R200_1000.style.pixelWidth ="500"
```

The type of visual rendering desired in dynamic fields 610 will control which commands are used as the instructional elements in each specialized tag. This is a matter of web design preference. Once the user has created the web page file containing the specialized tags that will control the rendering of the real world data in dynamic fields 610, step 520 is completed. The web page file is also created so as to comprise scripting information/commands (discussed below). The web page file is then stored on host computer 410, completing step 530 of FIG. 5.

Upon receiving a request from one of the client computers 420, the web page file is transmitted from host computer 410 to client computer 420 for display in computer monitor 100. A request for the web page file is generated by a user typing in the web address associated with the web page file via browser 120 of client computer 420. Once client computer 420 makes the request, the web page file is transmitted to client computer 420 as a data signal. A copy of the web page file is then stored in a browser memory of the client computer 420, completing step 540 of FIG. 5.

Once loaded into and stored in the browser memory, browser 120 displays this copy of the web page file as a visible web page according to the instructions contained in the HTML code. This visible web page comprises primary frame 620 having dynamic fields 610. As illustrated, primary frame 620 encompasses the entire viewable area of browser 120. Thus, step 550 of FIG. 5 is completed.

Host computer 410 is programmed, via software or other means, to continuously search file folders contained in its memory for web page files that contain the specialized tags. In the example, host computer 410 searches for tags that contain the HMI prefix. As discussed above the specialized tags contain the style of rendering required and the specific data value that drives the rendering. Specifically, host computer 410 searches for new web page files or existing web page files that contain specialized tags that have changed. The web page files are parsed looking for the specialized tags and these tags are stored in internal memory arrays. These specialized tags are instructions that perform various tasks based upon the data point specified. Once a web page has been completed it is not expected that the content will change often. Therefore it is more efficient to parse a file once, save the tag commands and the date that file was last modified. The storage of the file modified date will be used to determine if the file content has changed and would therefore need to be re-parsed.

Once a web page file is found containing specialized tags, host computer 410 will communicate with PLC 430 and retrieve the most currently updated real world data that is stored in the nonvolatile memory of PLC 430. Host computer 410 will then create a companion file comprising scripting information that will manipulate the specialized tags of the web page file copy stored in the browser memory when executed. The exact scripting information created by host computer 410 is a function of both the instructional elements of that web page file's specialized tags and the most currently updated real world data retrieved from PLC 430. As such, step 560 of FIG. 5 is completed.

Host computer 410 performs its parsing, companion file creation, and retrieval of updated real world data tasks continuously. Thus, upon host computer retrieving updated real world data, a new companion file is created, replacing the existing companion file. Thus, the companion file contains scripting information that is updated to represent real world conditions in substantially real time. Preferably, companion files are stored in a memory source of the host computer 410.

On the client side, client computer 420 is displaying the copy of the web page file stored in its browser memory in computer monitor 100 as HMI 600 (i.e. a visible web page). Client computer 420 is adapted to periodically download the most updated companion file associated with the web page file corresponding to HMI 600 from host computer 410, thus completing step 570. This downloading is accomplished without performing a browser-based refresh of primary frame 620. Client computer 420 periodically downloads the companion page into a variable and then this variable which contains a series program instruction is executed.

There are number of methods to perform the periodic download by client computer 420. One method uses a framing technique. In using a framing methodology, the visible web page will consist of a secondary frame in addition to primary frame 620. Typically, each frame would occupy a visible portion of browser's 120 display area based on the mapping set forth in a frameset element. Moreover, a frame object can be a web page in itself. With respect to the present invention browser's 120 display area would be divided into vertical windows comprising primary frame 620 and a secondary frame (hidden). The secondary frame would be reduced to a very small horizontal line and be substantially hidden. The secondary frame would not render any information but would be used to retrieve the companion file by executing a refresh command controlled by refresh scripting information. Upon refresh of the secondary frame being complete, the content of the companion file which is in essence scripting is executed. The secondary frame contains directional scripting information that directs the scripting information contained within the companion file to the primary frame 620 upon being executed. As a result, the specialized tag of the web page file copy within the browser memory is changed. Thus, the visible data that is rendered in dynamic fields 610 is updated to correspond to the real world data that influenced creation of the downloaded companion file, completing step 580. Moreover, because the downloading of the companion file is periodic, and because the companion file is updated to represent current real world data stored in PLC 430, the dynamic fields 610 render visible data representing real world condition in substantially real time.

A second method for periodic downloading of the companion file would be to use a download object function like "DOWNLOAD" which is available with Microsoft's Internet Explorer. After this object is placed in the HTML code as an Object, it is scriptable. A timer periodically performs a file download from host computer 420. The "DownLoad" method actives a function call when the download task is complete. The content of the file download is contained in a string variable. A string is a collection of text characters. In this case the string is a series of scripting commands. The function called by the completion of the download command subsequently performs a window.execute script function and additionally specifies the language of the script. The following script demonstrates the code required for this method. This scripting would be placed in the script section of the web page.

```
<! NonFrame Approach Using IE DownLoad ***************************>
<HTML XMLNS:IE>
<IE:DOWNLOAD ID="oFileDownload" STYLE="behavior:url(#default#download)" />
<SCRIPT LANGUAGE="VBScript">
Dim zLink
Dim FileName
Filename="name of companion file"
window.setinterval "RefreshData", 1000, "VBscript"
Sub RefreshData( )
oFileDownload.startDownload Filename, GetRef("DownloadDone")
end sub
Function DownloadDone(s)
Dim varz
if s <> "" then varz= window.execscript(s,"vbscript")
End Function
</script>
```

Figure 9:
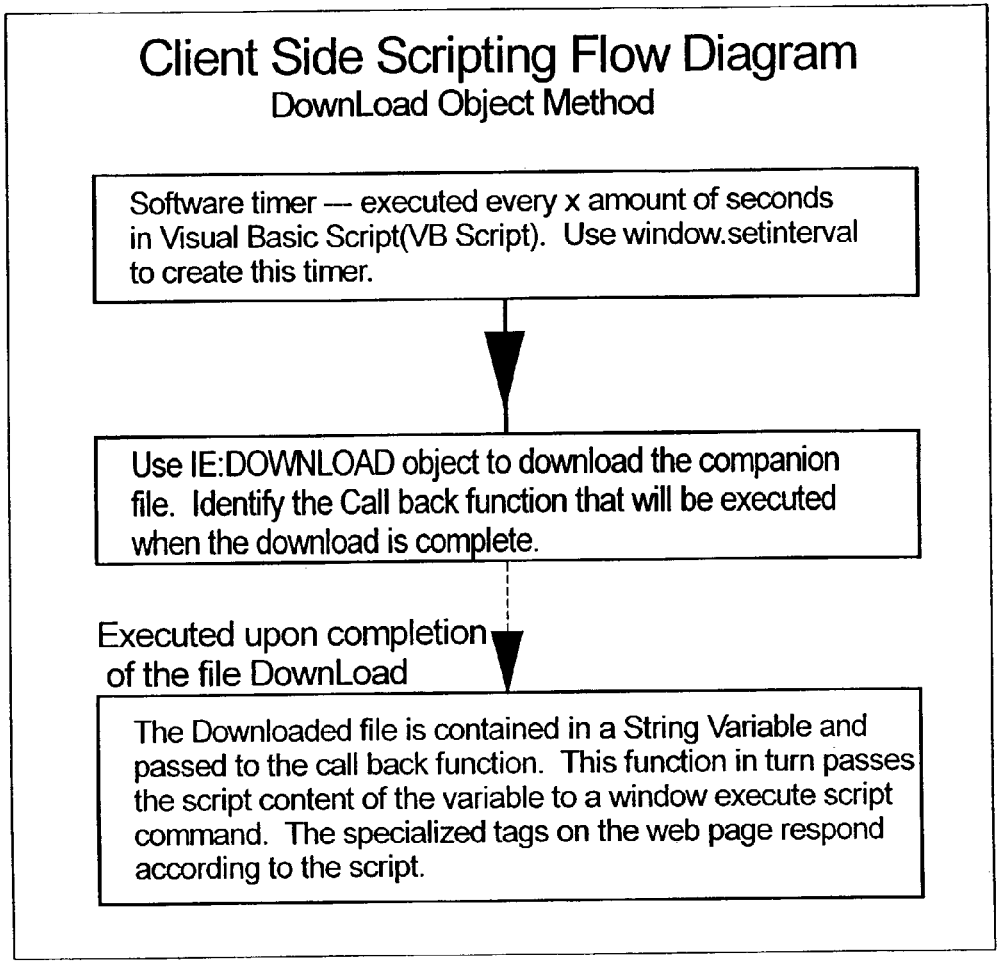
FIG. 9 is a flowchart of the client-side scripting using Microsoft Internet Explorer's DownLoad object.

A flow diagram depicting the client side script required using a Microsoft IE-DownLoad object is provided in FIG. 9.

A third method of a download function would be a derivative of the object download method and would entail the creation of a specialized object for this task. This method would require that the custom object be downloaded to client computer 420.

The present invention can be used to display/render visible data representing real world conditions in an assortment of different styles in dynamic field 610. Text can be presented based upon the state of the data. For example if PLC 430 is linked to switch 450, the specialized tag can be instructed to provide the word "Closed" when switch 450 is closed and the word "Open" when switch 450 is open. Values may be rendered in numerical form and in various engineering units. Vertical or horizontal bar graphs proportional to the maximum value of a data point can be created. Tags can be instructed to change color for example to indicate an alarm scenario. Graphs can be created providing line trends of the data. Image files or Animated Gifs can be made visible or invisible based upon the data by the web animator. As an example, a digital picture may be taken of switch 450 in the open position and another digital picture maybe taken of switch 450 in the closed position. Based upon the state of the real world data, the appropriate image would be instructed to become visible on the web page in the scripting information of the companion file that is downloaded. Animated Gif's are image files that contain multiple picture frames. A GIF (Graphics Interchange Format) is an image file standard created by CompuServe Incorporated. These frames are then rendered by gif creation software much like an endless video. Therefore digital pictures can be taken of some actual device in motion and these pictures can be assembled with gif creation software. The host computer can then instruct a static image file to become visible when a device is stationary and then instruct the animated GIF file to become visible when a device is running.

Figure 7:
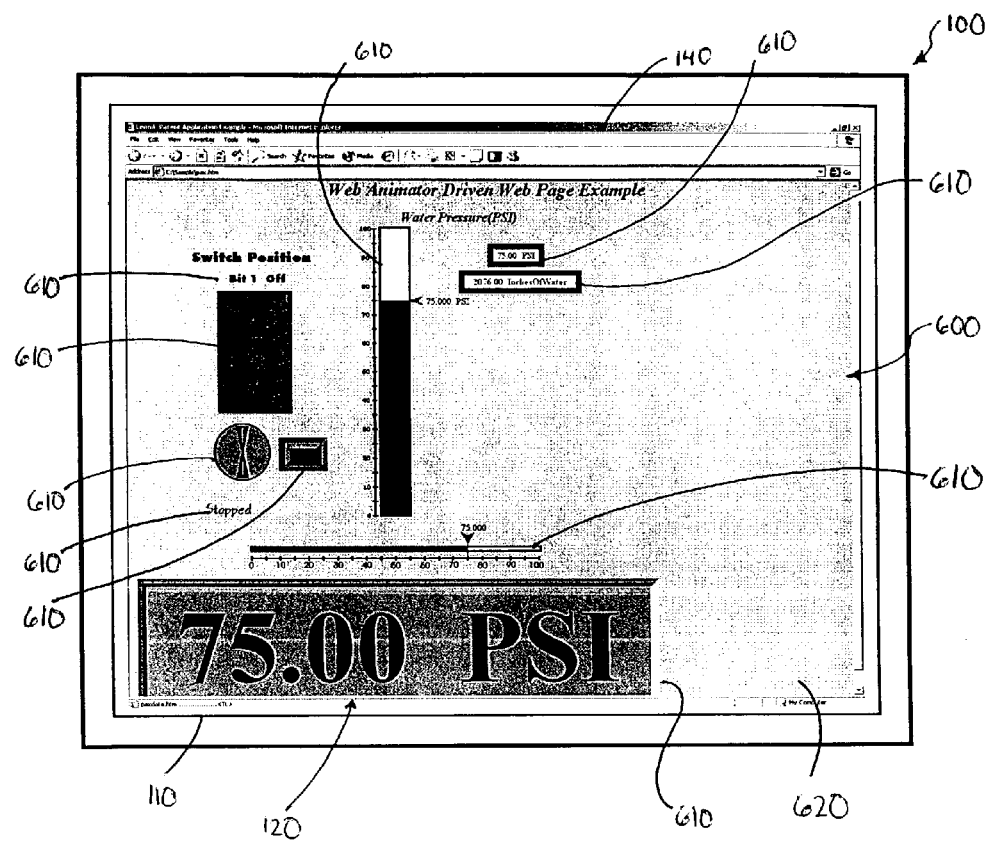
FIG. 7 is a schematic of a computer monitor displaying a dynamic HMI produced according to the method of FIG. 5 at a second time.

FIGS. 6 and 7 illustrate the dynamic rendering or real world data at different points in time. The changes of the values and visible data rendered in dynamic fields 610 is the result of the scripting information of the companion file being downloaded changing over time as a result of the real world data stored in PLC 430 being updated.

Assume that PLC 430 registers the data from pressure transducer 440 in R1(Register 1) and registers the data from switch 450 in R2(Register 2). Register 1 contains a water pressure value that has a full scale range of 100 PSI (pounds per Square Inch). Register 2 is a register that contains bit information where bit 1 is linked to an external switch. Several command tags will be demonstrated as an example.

FIG. 6 shows how HMI 600 would be rendered in Microsoft's Internet Explorer with the value of register 1 at 33.33 and register 2 bit equal to a one. All the value locations change accordingly. The bar graphs change to show the position of the pressure reading relative to the 100 PSI full scale range. Images that are instructed to move migrate to the correct position. The bit tags render according to the respective command tags. The bladed circle begins rotating with 45 degree increments counter clockwise in order to indicate motion. This is accomplished by making a four frame animated GIF file visible. A photo of a switch plate with a switch in the up position becomes visible. The host computer 410, with the conditions stated, creates a companion page for the web page file associated with HMI 600 as follows:

```
On Error Resume Next
HMI_M_1_R2B01.innertext=" Bit 1 On"
HMI_V_2_R1_2_PSI.innertext="33.33 PSI"
HMI_VB_1_R1_500.style.pixelHeight="333"
HMI_MIV_1_R1_500_94.style.posTop="427"
HMI_MVV_1_R1_500_93_3_PSI.innertext="33.330 PSI"
HMI_MVV_1_R1_500_93_3_PSI.style.posTop="426"
HMI_HB_1_R1_500.style.pixelWidth ="167"
HMI_MIH_1_R1_500_206.style.posLeft ="373"
HMI_MVH_1_R1_500_206_3_PSI.innertext="33.330"
HMI_MVH_1_R1_500_206_3_PSI.style.posleft="373"
HMI_VIS_1_R2B01.style.visibility ="visible"
HMI_HIDE_1_R2B01.style.visibility ="hidden"
HMI_V_3_R1_2_PSI.innertext="33.33 PSI"
HMI_V_2_R1_2_InchesOfWater_27p68.innertext="922.57
```

-continued

```
InchesOfWater"
HMI_VIS_2_R2B01.style.visibility ="visible"
HMI_HIDE_2_R2B01.style.visibility ="hidden"
HMI_AM_3_R2B01_Running_Stopped.innertext="Running"
HMI_P_2_R2B01.style.background="Lime"
```

With the exception of the first statement above on the companion page, all of the command tag responses have previously been discussed. The first statement is simply an error handling instruction that informs the VB script running on the web page to ignore any errors that may be generated. This instruction is very useful in the developmental stage where tags are modified or deleted and thus prevents nuisance error messages. Once the development is complete, the likelihood of an error occurring is very small.

For exemplary purposes, the horizontal bar command(HB) will be examined to see just how the host computer 410 determines the proper response based on a pressure value of 33.33. The horizontal bar on this page contains a tag command as follows:

```
<div id="HMI_HB_1_R1_500" style="position: absolute;
top: 658; left: 218; width: 47; height: 4; background-color: #0000ff;
padding: 0"><p>
</div>
```

The HB tag instructs the host computer 410 to get the value of R1 (register 1). It also informs host computer 410 that the horizontal bar graph is to span 500 pixels by the value of element 4. Host computer 410 calculates the ratio of the value to the full scale which in this case is 33.33/100 or 0.3333. This ratio is then applied to the range of the bar or 500 pixels. The result of this multiplication (0.3333 time 500) is 166.5. This value is rounded up to 167 pixels because the script requires a whole number value. The response is HMI_HB_1_R1_500.style.pixelWidth="167". This script command makes the DIV with ID="HMI_HB_1_R1_500" obtain a width of 167 and a horizontal bar graph is correctly rendered in dynamic field 610 of HMI 600 upon execution. The DIV grows to the left of the left position tag which is 218(218 pixels from the left side of the page) by 167 pixels. An image file of a 0 to 100 scale, 500 pixels wide is provided as a reference to gauge the bar.

FIG. 7 shows how HMI 600 would be rendered in Microsoft's Internet Explorer with a pressure value of 75 for register 1 and with register 2 bit 1 at 0. The value commands change accordingly rendering a value of 75 PSI. The bar graphs and moving items migrate to the proper position. The Register 2 bit 1 is now a zero. The bit tags change accordingly. The image of a switch plate with a switch in the off position is now rendered. The animated gif image is instructed to be hidden while the stationary gif image is rendered visible. As previously discussed an animated gif is a stand alone image-object that when rendered in a browser continuously increments through the frames. For the conditions stated, host computer 410 creates a companion page for this web page as follows:

```
On Error Resume Next
HMI_M_1_R2B01.innertext=" Bit 1 Off"
HMI_V_2_R1_2_PSI.innertext="75.00 PSI"
```

-continued

```
HMI_VB_1_R1_500.style.pixelHeight="125"
HMI_MIV_1_R1_500_94.style.posTop="219"
HMI_MVV_1_R1_500_93_3_PSI.innertext="75.000 PSI"
HMI_MVV_1_R1_500_93_3_PSI.style.posTop="218"
HMI_HB_1_R1_500.style.pixelWidth ="375"
HMI_MIH_1_R1_500_206.style.posLeft ="581"
HMI_MVH_1_R1_500_206_3_PSI.innertext="75.000"
HMI_MVH_1_R1_500_206_3_PSI.style.posleft="581"
HMI_VIS_1_R2B01.style.visibility ="hidden"
HMI_HIDE_1_R2B01.style.visibility ="visible"
HMI_V_3_R1_2_PSI.innertext="75.00 PSI"
HMI_V_2_R1_2_InchesOfWater_27p68.innertext="2076.00 InchesOfWater"
HMI_VIS_2_R2B01.style.visibility ="hidden"
HMI_HIDE_2_R2B01.style.visibility ="visible"
HMI_AM_3_R2B01_Running_Stopped.innertext="Stopped"
HMI_P_2_R2B01.style.background="Black"
```

It is possible to adapt HMI system 400 to allow a user to control switch 450 and/or pressure transducer 440 by inputting data into client computer 420. In carrying out this feature, a user inputs control data to client computer 420 via a keyboard or other user input module. The control data can be inputted into data field of a separate visible web page on the computer monitor 100, completing step 590 of FIG. 5. Upon receipt of a transmit command, client computer 420 will transmit the inputted user control data to host computer 410 and then to PLC 430, completing step 595. In this embodiment, PLC 430 is programmed to convert user control data into control signals. These control signals are then relayed to switch 450 and/or pressure transducer 440. For example the PLC may be performing a closed loop control of a water pump maintaining a constant pressure setpoint as specified by the HMI and a remote run command may be issued by the HMI causing the switch position to change. Upon receipt of the control signals, switch 450 and/or pressure transducer 440 will respond in accordance with said control signals, completing step 599 of FIG. 5. For example, switch 450 may move from a closed to an open position.

The foregoing is an illustration of the present invention but should not be considered limited to the methods discussed. The commands provided can be enhanced to contain other features and new commands can be created offering other functions. Add-in features can be applied to some web authoring software so it is conceivable that the invention can become even more streamlined by providing pull a down menu with listing of special function tags along with the required structure.

While the invention and preferred embodiments have been described and illustrated in sufficient detail that those skilled in this art may readily make and use the invention, various alternatives, modifications and improvements should become readily apparent to this skilled in this art without departing from the spirit and scope of the invention.

What is claimed is:

1. A method of dynamically displaying data in a browser of a client computer comprising:
   periodically collecting data representing real world conditions via data collection means;
   storing said real world data in a memory source, wherein said stored real world data is periodically updated to represent current real world conditions;
   creating a web page file with programming language containing standard HTML tags adapted to facilitate rendering of visual data in dynamic fields and static tags adapted to facilitate rendering of static content, said standard HTML tags having a unique identifier attribute comprising a prefix element, at least one command element, an identifier number element, at least one data point element, and at least one command variable element;
   storing said web page file on a host computer;
   transmitting said web page file to said client computer, wherein a copy of said web page file is stored in a client-side memory;
   displaying said copy of said web page file in the form of a visual web page in said browser, said visual web page comprising a primary frame comprising said dynamic fields;
   searching said programming language of said web page file on said host computer for said unique identifier attribute and parsing out said standard HTML tags using said unique identifier attribute;
   upon said real world data being updated in said memory source, creating a companion file of scripting information based on said parsed out unique identifier attribute of said standard HTML tags and said updated real world data stored in said memory source;
   downloading said companion file to said client computer; and
   executing said scripting information contained within said companion file causing said rendering of visual data in said dynamic field to correspond to said updated real world data.

2. The method of claim 1 wherein said visual web page further comprises a secondary frame that is substantially hidden, wherein periodic downloading of said companion file is accomplished by refreshing said secondary frame.

3. The method of claim 2 wherein said primary frame comprises refresh scripting information adapted to periodically refresh said secondary frame at predetermined intervals of time.

4. The method of claim 2 wherein said secondary frame further comprises directional scripting information adapted to direct said scripting information of said download companion file to said standard HTML tags having said unique identifier attribute within said primary frame.

5. The method of claim 1 wherein periodic downloading of said companion file is accomplished by performing a download object command, an object being downloaded at set intervals of time.

6. The method of claim 1 wherein said searching, parsing and companion file creating steps are continuously repeated.

7. The method of claim 1 wherein all scripting is performed on a client side.

8. The method of claim 1 wherein said companion file is stored on said host computer after creation.

9. The method of claim 1 wherein said primary frame of said visual web page is never subject to a browser-based refresh.

10. The method of claim 1 wherein said programming language is browser based markup language code.

11. The method of claim 1 wherein said standard HTML tags having said unique identifier attribute are added to said programming language of said web page file by standard web authoring software.

12. The method of claim 1 wherein said standard HTML tags having said unique identifier attribute are added to said programming language by software that provides access to said web page file.

13. The method of claim 12 wherein said software is any text editor software that permits files to be stored as pure text and contains no formatting instructions.

14. The method of claim 1 wherein said standard HTML tags having said unique identifier attribute are added to said web page file that was originally created by a first web authoring software that does not support access to said programming language but where said web page file is loaded into a second web authoring software that does support adding said standard HTML tags having said unique identifier attribute.

15. The method of claim 1 wherein said host computer is a server.

16. The method of claim 1 wherein said executing step updates said copy of said web page file stored in said client-side memory to correspond to said updated real world data.

17. The method of claim 1 wherein said client-side memory is a browser memory.

18. The method of claim 1 further comprising:
receiving user control data inputted by a user at said client computer;
transmitting said user control data to a logic controller adapted to convert user control data into control signals; and
sending said control signals to a real world device, wherein upon receipt of said control signals, said real world device is manipulated in accordance with said control signals.

19. A method of dynamically displaying data in a browser of a client computer comprising:
displaying a copy of a web page comprising a primary frame having dynamic fields in said browser wherein said web page is created by programming language containing standard HTML tags adapted to facilitate rendering of visual data in said dynamic fields and static tags adapted to facilitate rendering of static content, said standard HTML tags having a unique identifier attribute comprising a prefix element, at least one command element, an identifier number element, at least one data point element, and at least one command variable element;
searching said programming language of said web page that resides on a host computer for said unique identifier attribute and parsing out said standard HTML tags using said unique identifier attribute and creating a companion file of scripting information based on said parsed out unique identifier attribute of said standard HTML tags world data stored in a memory source;
downloading said companion file to the client computer; and
executing said scripting information contained within said companion file causing said rendering of visual data in said dynamic fields to correspond to said updated real world data.

20. The method of claim 19 wherein said downloading step is performed without refreshing said primary frame.

21. An apparatus for dynamically displaying data comprising:
a processor;
a graphical interface for displaying a copy of a web page comprising a primary frame having dynamic fields, wherein said web page is created by programming language containing standard HTML tags adapted to facilitate rendering of visual data in said dynamic fields, and static tags adapted to facilitate rendering of static content, said standard HTML tags having a unique identifier attribute comprising a prefix element, at least one command element, an identifier number element, at least one data point element, and at least one command variable dement;
means for searching said programming language of said web page that resides on a host computer for said unique identifier attribute and parsing out said standard HTML tags using said unique identifier attribute;
means for creating a companion file of scripting information based on said parsed out unique identifier attribute of said standard HTML tags and updated real world data stored in a memory source;
means for downloading said companion file;
means for executing said scripting information contained within said companion file; and
means for changing said rendering of visual data in said dynamic fields to correspond to said updated real world data.

* * * * *